US010592841B2

(12) United States Patent
Talmor et al.

(10) Patent No.: US 10,592,841 B2
(45) Date of Patent: Mar. 17, 2020

(54) AUTOMATIC CLUSTERING BY TOPIC AND PRIORITIZING ONLINE FEED ITEMS

(71) Applicant: salesforce.com, inc., San Francisco, CA (US)

(72) Inventors: Alon Talmor, Tel Aviv (IL); Tal Menahem Brown, Tel Aviv (IL)

(73) Assignee: SALESFORCE.COM, INC., San Francisco, CA (US)

( * ) Notice: Subject to any disclaimer, the term of this patent is extended or adjusted under 35 U.S.C. 154(b) by 871 days.

(21) Appl. No.: 14/512,222

(22) Filed: Oct. 10, 2014

(65) Prior Publication Data

US 2016/0103917 A1   Apr. 14, 2016

(51) Int. Cl.
*G06Q 10/06* (2012.01)

(52) U.S. Cl.
CPC ................. *G06Q 10/067* (2013.01)

(58) Field of Classification Search
CPC ........... G06F 17/30867; G06F 17/3071; G06F 17/30705; G06Q 10/067
USPC ....................................................... 707/738
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

OTHER PUBLICATIONS

P. E. Hart and J. Graham, "Query-free information retrieval," in IEEE Expert, vol. 12, No. 5, pp. 32-37, Sep./Oct. 1997. Retreived Apr. 28, 2018 from <http://ieeexplore.ieee.org/stamp/stamp.jsp?tp=&arnumber=621226&isnumber=13513> (Year: 1997).*

(Continued)

*Primary Examiner* — Robert W Beausoliel, Jr.
*Assistant Examiner* — Arthur Ganger
(74) *Attorney, Agent, or Firm* — Morris & Kamlay LLP

(57) ABSTRACT

The technology disclosed relates to presenting important business insights to a sales engineer. In particular, the technology disclosed assembles a set of news feed items for companies of interest to a sales engineer and groups them into topics. It also qualifies some of the news feed items to return or not based on mandatory or prohibited words in the news feed items. Further, it determines a plurality of metric values for each of the returned news feed items that are based on one of a source metric, business metric, company reference metric, social buzz metric, and matched account metric. It then orders the news feed items, based on the determined metric values, with respect to one or more of source reputation, business activity-related vocabulary, company-name mention, social buzz, and correlation with accounts preferred by the sales engineer, and presents the ordered news feed items as business insights about the topics.

20 Claims, 7 Drawing Sheets

(56) References Cited

U.S. PATENT DOCUMENTS

| | | | |
|---|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,457,028 B1 | 9/2002 | Pitkow et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,658,423 B1 | 12/2003 | Pugh et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,293,019 B2 | 11/2007 | Dumais et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,660,819 B1 | 2/2010 | Frieder et al. |
| 7,698,160 B2 | 4/2010 | Beaven et al. |
| 7,707,157 B1 | 4/2010 | Shen |
| 7,734,627 B1 | 6/2010 | Tong |
| 7,779,475 B2 | 8/2010 | Jakobson et al. |
| 7,814,107 B1 | 10/2010 | Thirumalai et al. |
| 7,851,004 B2 | 12/2010 | Hirao et al. |
| 7,865,830 B2 | 1/2011 | Kim et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,290,962 B1 | 10/2012 | Chu |
| 8,370,361 B2 * | 2/2013 | Topham ............... G06F 16/313 707/738 |
| 8,370,390 B1 | 2/2013 | Permakoff |
| 8,457,545 B2 | 6/2013 | Chan |
| 8,458,194 B1 | 6/2013 | Procopio |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,706,739 B1 | 4/2014 | Song et al. |
| 8,744,839 B2 * | 6/2014 | Sun ..................... G06F 17/277 704/10 |
| 8,756,275 B2 | 6/2014 | Jakobson |
| 8,769,004 B2 | 7/2014 | Jakobson |
| 8,769,017 B2 | 7/2014 | Jakobson |
| 8,793,238 B1 | 7/2014 | Carver et al. |
| 8,805,840 B1 | 8/2014 | Joshi et al. |
| 9,165,061 B2 | 10/2015 | Fertik et al. |
| 9,483,518 B2 * | 11/2016 | Schechter ......... G06F 17/30867 |
| 2001/0044791 A1 | 11/2001 | Richter et al. |
| 2002/0028021 A1 | 3/2002 | Foote et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0135445 A1 * | 7/2003 | Herz .................... G06Q 40/06 705/37 |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249789 A1 | 12/2004 | Kapoor et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0021490 A1 | 1/2005 | Chen et al. |

(56) References Cited

U.S. PATENT DOCUMENTS

| | | |
|---|---|---|
| 2005/0027717 A1 | 2/2005 | Koudas et al. |
| 2005/0033657 A1* | 2/2005 | Herrington ....... G06F 17/30058 |
| | | 705/26.7 |
| 2005/0050555 A1 | 3/2005 | Exley et al. |
| 2005/0060643 A1 | 3/2005 | Glass et al. |
| 2005/0091098 A1 | 4/2005 | Brodersen et al. |
| 2006/0021019 A1 | 1/2006 | Hinton et al. |
| 2006/0101069 A1 | 5/2006 | Bell et al. |
| 2006/0167942 A1* | 7/2006 | Lucas ............... G06F 17/30994 |
| 2006/0271534 A1 | 11/2006 | Hamaguchi et al. |
| 2007/0143322 A1 | 6/2007 | Kothari et al. |
| 2007/0214097 A1 | 9/2007 | Parsons et al. |
| 2008/0243837 A1 | 10/2008 | Davis et al. |
| 2008/0249966 A1 | 10/2008 | Luege Mateos |
| 2008/0249972 A1 | 10/2008 | Dillon |
| 2009/0043797 A1 | 2/2009 | Dorie et al. |
| 2009/0063415 A1 | 3/2009 | Chatfield et al. |
| 2009/0099996 A1 | 4/2009 | Stefik |
| 2009/0100342 A1 | 4/2009 | Jakobson |
| 2009/0164408 A1 | 6/2009 | Grigorik et al. |
| 2009/0164411 A1 | 6/2009 | Dasdan et al. |
| 2009/0177744 A1 | 7/2009 | Marlow et al. |
| 2009/0182712 A1 | 7/2009 | Kamal et al. |
| 2009/0271359 A1 | 10/2009 | Bayliss |
| 2009/0313236 A1 | 12/2009 | Hernacki et al. |
| 2010/0153324 A1 | 6/2010 | Downs et al. |
| 2010/0198864 A1 | 8/2010 | Ravid et al. |
| 2010/0228731 A1 | 9/2010 | Gollapudi |
| 2010/0254615 A1 | 10/2010 | Kantor et al. |
| 2011/0087668 A1 | 4/2011 | Thomas et al. |
| 2011/0191105 A1* | 8/2011 | Spears ............. G06F 17/30867 |
| | | 704/251 |
| 2011/0218958 A1 | 9/2011 | Warshaysky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2012/0330728 A1* | 12/2012 | Enyeart ................ G06Q 10/00 |
| | | 705/7.39 |
| 2013/0054688 A1* | 2/2013 | Rourke ............ G06F 17/30038 |
| | | 709/204 |
| 2013/0091229 A1 | 4/2013 | Dunn et al. |
| 2013/0138577 A1* | 5/2013 | Sisk ....................... G06Q 30/02 |
| | | 705/36 R |
| 2013/0212497 A1 | 8/2013 | Zelenko et al. |
| 2013/0247216 A1 | 9/2013 | Cinarkaya et al. |
| 2014/0082006 A1 | 3/2014 | Knight et al. |
| 2014/0101134 A1* | 4/2014 | Bohrer .................. G06Q 30/02 |
| | | 707/722 |
| 2014/0108006 A1* | 4/2014 | Vogel ...................... G06F 17/28 |
| | | 704/9 |
| 2014/0214840 A1* | 7/2014 | Gupta ................. G06F 16/3322 |
| | | 707/738 |
| 2014/0280121 A1* | 9/2014 | Sharp ................. G06F 17/3053 |
| | | 707/732 |
| 2015/0081690 A1* | 3/2015 | Arom ................ G06F 17/30749 |
| | | 707/728 |
| 2015/0347593 A1* | 12/2015 | Tsai ................... G06F 17/30867 |
| | | 707/722 |
| 2016/0048764 A1* | 2/2016 | Viola ................. G06F 17/30867 |
| | | 706/11 |
| 2016/0330237 A1* | 11/2016 | Edlabadkar ......... H04L 63/1475 |

OTHER PUBLICATIONS

U.S. Appl. No. 14/512,215—"Systems and Methods of Deduplicating Similar News Feed Items", inventors Yair Even-Zohar and Elad Tsur, filed Oct. 10, 2014, 24 pages.

Broder, Andrei Z., "Identifying and Filtering Near-Duplicate Documents", CPM '00, Proceedings of the 11th Annual Symposium on Combinatorial Pattern Matching, Springer-Verlag London, UK, 2000, pp. 1-10.

U.S. Appl. No. 14/512,215—Office Action dated Oct. 19, 2016, 40 pages.

* cited by examiner

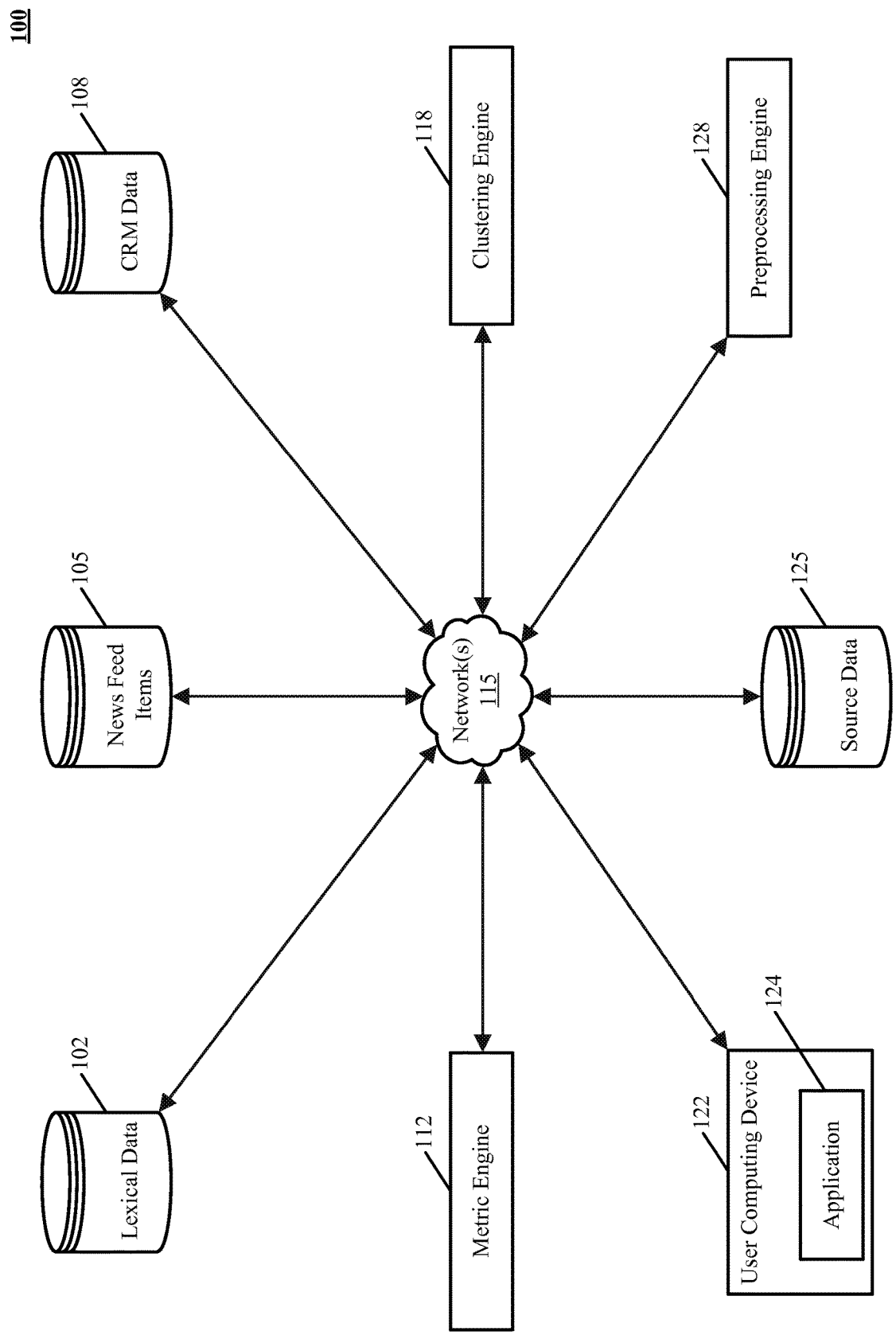
FIG. 1 – Servers, Clients, and Databases

200

⟩ 205

Salesforce acquires BlueTail  Tuesday, 2:00 AM  CNS News

Salesforce recently acquired an Israeli data-mining start-up called BlueTail. BlueTail's founder and CTO has been made chief data scientist at Data.com, a Salesforce unit.

⟩ 215

Celeb nude pics leaked  Tuesday, 12:30 AM  Spicenews.com

Numerous nude pics of A-list celebs hit the Internet this Monday.

⟩ 225

"Slave-Master" slurs cause ripples in NFL  Monday, 4:30 PM  ESPR.net

NFL owner in trouble over racial remarks.

⟩ 235

KLT stock spikes 60 points  Monday, 8:00 AM  Financialforce.com

Recent releases from the mobile giant boosted its share prices.

⟩ 245

Roland: Shareholders reach agreement  Sunday, 3:00 PM  Money.com

Roland's three biggest shareholders have reached an agreement to sell the investment company's wind assets in the United States.

⟩ 255

KallTech hosts its first annual tech conference  Saturday, 3:20 PM  Bayevents.org KallTech today announced its first annual mobile developer conference. Called KallTech Night, the event takes place on October 22 at the Civic Center in San Francisco, and costs $20.

FIG. 2 – News Feed Items

300A

| Source Name | Credibility Value |
|---|---|
| CNS News | 1 |
| Financialforce.com | 0.8 |
| Bayevents.org | 0.3 |
| Spicenews.com | 0.1 |

 Source Metric Values 302

| Title | Description | Source | Feed Item ID |
|---|---|---|---|
| "Sales……." | "Salesforce..." | CNS news | 01nfPW |
| ""Slave……." | ""NFL ow..." | ESPR.net | 02ko92 |
| "KallTe……." | "KallTech….." | Bayevents.org | 03ie01 |
| "Celeb……." | "Celeb nude ..." | Spicenews.com | 04ty76 |

 News Feed Items 312

| Feed Item ID | Likes | Posts |
|---|---|---|
| 01nfPW | 3039 | 554 |
| 02ko92 | 4452 | 432 |
| 03ie01 | 2345 | 443 |
| 04ty76 | 5323 | 210 |

 Social Buzz Metric Values 322

FIG. 3A – Data Objects

300B

| Accounts | Preference Value |
|---|---|
| Salesforce.com | 1 |

⋮ Account Preference Metric Values 332

| Global Interest Words | Interest Value |
|---|---|
| Huge | 1 |

⋮ Global Interest Metric Values 342

| Dangerous Phrases | Danger Value |
|---|---|
| Slave-Master | 1 |

⋮ Dangerous Phrases Metric Values 352

| Business Nomenclature | Business Value |
|---|---|
| Acquire | 1 |

⋮ Business Metric Values 362

| Company Name | Alternative Names | Abbreviations | Reference Value |
|---|---|---|---|
| BlueSpring | bluspr | BlSp | 1 |

⋮ Company Reference Metric Values 372

FIG. 3B – Data Objects

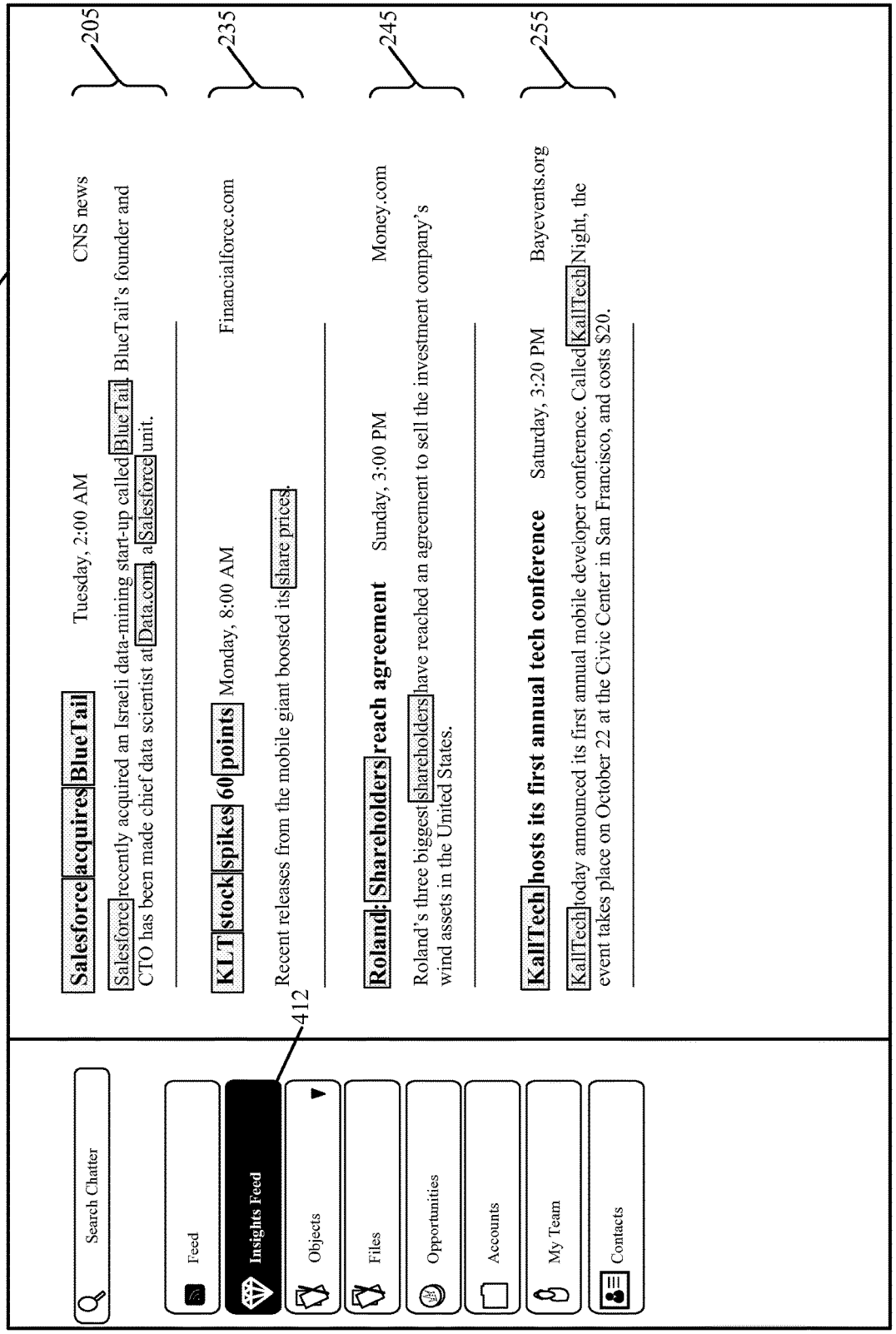
FIG. 4 – Business Insights

500

502 — assembling a set of news feed items for companies of interest from a plurality of electronic sources for display to a sales engineer and grouping the assembled set into clusters based on at least one topic 512 — preprocessing the clusters to return some of the news feed items based on one or more occurrences of prohibited and mandatory words in respective titles and descriptions of the news feed items 522 — determining a plurality of metric values for each of the returned news feed item 532 — ordering the returned news feed items based on the determined metric values and presenting to the sales engineer one or more of the ordered news feed items as business insights about the topic

FIG. 5 – Business Insights Presentation

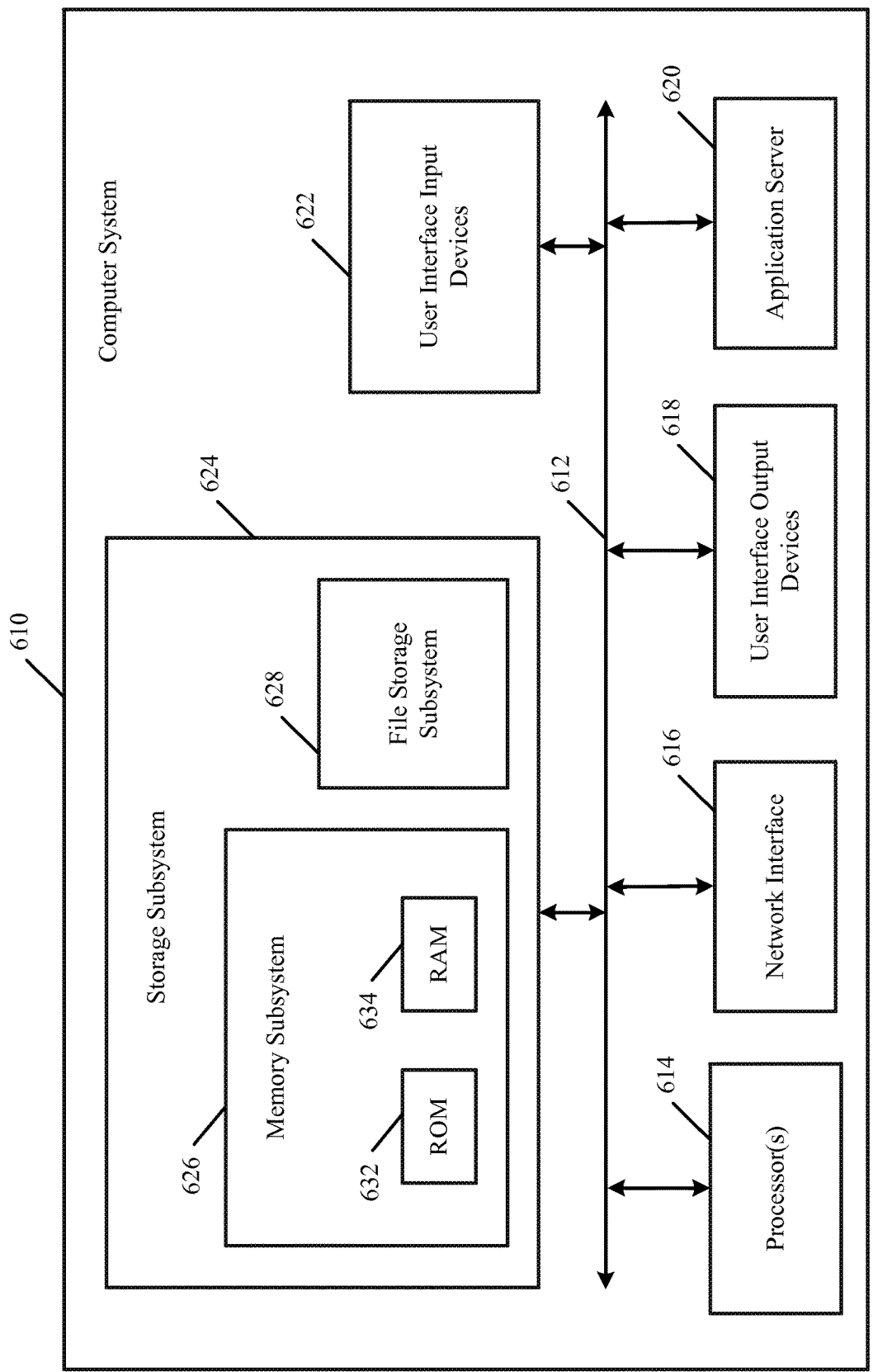
FIG. 6 – Computer System

AUTOMATIC CLUSTERING BY TOPIC AND PRIORITIZING ONLINE FEED ITEMS

RELATED APPLICATION

This application is related to US Patent Application entitled "Systems and Methods of Presenting De-Duplicating Similar News Feed Items," U.S. application Ser. No. 14/512,215, filed May 29, 2018, now U.S. Pat. No. 9,984,166. The related application is hereby incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

As the volume of information flowing on the web continues to increase, the need for automated tools that can assist users in receiving information valuable to them also increases. The information overload created by multitude of information sources, such as websites and social media sites, makes it difficult for users to know what piece of information is more suitable, relevant, or appropriate to their needs and desires. Also, a substantial portion of users' web surfing time is spent on separating information from noise.

In particular, service providers are continually challenged to deliver value and convenience to users by, for example, providing efficient search engine with high precision and low recall. One area of interest has been the development of finding and accessing desired content or search results. Currently, users locate content by forging through lengthy and exhausting search results, many of which include similar information. However, such methods can be time consuming and troublesome, especially if users are not exactly sure what they are looking for. Although these issues exist with respect to non-mobile devices, such issues are amplified when it comes to finding desired content or search results using mobile devices that have much limited screen space and can only display few search results per screen.

An opportunity arises to shift the burden of information filtering from users to automated systems and methods that derive important and personalized business insights from large volumes of news feed items. Improved user experience and engagement and higher user satisfaction and retention may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 1 shows an example environment of generating important business insights.

FIG. 2 illustrates a set of news feed items assembled from a plurality of electronic sources.

FIGS. 3A and 3B depicts one implementation of a plurality of objects that can be used to generate important business insights.

FIG. 4 is one implementation of ordered news feed items based on a plurality of metric values.

FIG. 5 is a representative method of generating important business insights.

FIG. 6 is a block diagram of an example computer system used to generate important business insights.

DETAILED DESCRIPTION

Introduction

Sales engineers use a variety of different computer-based information sources such as search engines (e.g., Google™, MSN®, Yahoo! ®, etc.) to find information they are seeking. Typically, they are looking for information relevant to a work task in which they are currently engaged. For example, a sales engineer may be interested in information related to a prospect for planning a sales pitch or to an account with which she would be having a routine status call. Currently, the sales engineer enters a query into an input box, and the search engine examines data associated with thousands of documents. The search engine then sends the sales engineer a list of search results. In an effort to help users find relevant information quickly, most information sources rank search results for presentation to the user, thereby reducing the user's need to wade through a long list of search results. For example, documents that a search engine determines to be most relevant to the user's query are typically placed first in a list of search results.

Typically, search engines use some form of term frequency-inverse document frequency (TF/IDF) ranking algorithm or some similar method to determine this presentation order or other organization scheme. TF/IDF scores documents in direct proportion to the number of query terms present in the document and in inverse proportion to some function of the number of times the query terms appear in the information repository as a whole. In other words, documents with many occurrences of rare query terms are ranked highly. In addition, other factors may be used to rank the documents, such as the number of times other documents reference that document. Search engines might also display the documents retrieved based on data associated with the retrieved documents. For example, documents labeled with the same subject area might be presented in the same folder.

One problem with this method of ranking, organizing and presenting retrieved documents when seeking information most helpful to a sales engineer is that the query terms alone are used to assess the relevance of the search results in the course of retrieval. However, most search engines place limitations on the length of the query and/or limitations on other aspects of the manner in which the search may be specified (e.g., the types of constraints that may be specified on desired results). For example, a search engine may limit the number of terms in a query to five, or the search engine may not contain a method for specifying a date range.

In general, however, what is important to the sales engineer is typically too complex to be represented in such a compressed and simplified form. For example, if the sales engineer wants a streamlined news feed that omits news articles unrelated to her specific line of work and only includes news articles that relate to her accounts, business preferences, and broad filed of work, then this cannot be represented by a limited query. Also, the sales engineer cannot be expected to enter a search query every time she wants to get the news of her interest. Therefore, assessing, ranking, organizing, and presenting search results associated with the sales engineer's context simply using a query acceptable to a given search engine may not produce the best results.

Another problem with relying solely on the rankings or organization schemes provided by search engines themselves occurs when querying multiple information sources. Different information sources typically do not use the same scoring algorithm in determining what to return and what order to return it in or in determining how to organize and present these results. As a result, ranking and/or organizing scores associated with results from different search engines typically cannot reliably be used to combine multiple result lists into combined results lists.

As a result, a better strategy for presenting information should be determined. The technology disclosed solves these problems by automatically determining which news feed items would be most useful to the sales engineer, which news feed items should be presented to the sales engineer, and how the news feed items should be ordered and presented to the sales engineer.

In one implementation, the technology disclosed assembles a set of news feed items for companies of interest to a sales engineer and groups the assembled set into clusters based on topics. It also preprocesses the clusters to qualify some of the news feed items to return or not based on one or more occurrences of mandatory or prohibited words in respective titles and descriptions of the news feed items. Further, it determines a plurality of metric values for each of the returned news feed item that are based on at least one of source metric, business metric, company reference metric, social buzz metric, and matched account metric. It then orders the news feed items, based on the determined metric values, with respect to one or more of source reputation, business activity-related vocabulary, company-name mention, social buzz, and correlation with accounts preferred by the sales engineer, and presents the ordered news feed items as business insights about the topics.

Examples of systems, apparatus, and methods according to the disclosed implementations are described in a "news feed items" context. The example of news feed items are being provided solely to add context and aid in the understanding of the disclosed implementations. In other instances, examples of different textual entities like contacts, documents, and social profiles may be used. Other applications are possible, such that the following examples should not be taken as definitive or limiting either in scope, context, or setting. It will thus be apparent to one skilled in the art that implementations may be practiced in or outside the "news feed items" context.

The described subject matter is implemented by a computer-implemented system, such as a software-based system, a database system, a multi-tenant environment, or the like. Moreover, the described subject matter can be implemented in connection with two or more separate and distinct computer-implemented systems that cooperate and communicate with one another. One or more implementations can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied.

As used herein, the "specification" of an item of information does not necessarily require the direct specification of that item of information. Information can be "specified" in a field by simply referring to the actual information through one or more layers of indirection, or by identifying one or more items of different information which are together sufficient to determine the actual item of information. In addition, the term "identify" is used herein to mean the same as "specify."

As used herein, a given signal, event or value is "responsive to" a predecessor signal, event or value of the predecessor signal, event or value influenced by the given signal, event or value. If there is an intervening processing element, step or time period, the given signal, event or value can still be "responsive to" the predecessor signal, event or value. If the intervening processing element or step combines more than one signal, event or value, the signal output of the processing element or step is considered "responsive to" each of the signal, event or value inputs. If the given signal, event or value is the same as the predecessor signal, event or value, this is merely a degenerate case in which the given signal, event or value is still considered to be "responsive to" or "based on" the predecessor signal, event or value. "Dependency" of a given signal, event or value upon another signal, event or value is defined similarly.

Business Insights Generation Environment

FIG. 1 shows an example environment 100 of generating important business insights. FIG. 1 includes a lexical data database 102, news feed items database 105, and CRM data database 108. FIG. 1 also shows metric engine 112, network(s) 115, clustering engine 118, user computing device 122, application 124, source data database 125, and preprocessing engine 128. In other implementations, environment 100 may not have the same elements or components as those listed above and/or may have other/different elements or components instead of, or in addition to, those listed above, such as a scoring engine, filtering engine, sequence alignment engine, strongly connected components engine, and cluster head engine. The different elements or components can be combined into single software modules and multiple software modules can run on the same hardware.

Network(s) 115 is any network or combination of networks of devices that communicate with one another. For example, network(s) 115 can be any one or any combination of a LAN (local area network), WAN (wide area network), telephone network (Public Switched Telephone Network (PSTN), Session Initiation Protocol (SIP), 3G, 4G LTE), wireless network, point-to-point network, star network, token ring network, hub network, WiMAX, WiFi, peer-to-peer connections like Bluetooth, Near Field Communication (NFC), Z-Wave, ZigBee, or other appropriate configuration of data networks, including the Internet. In other implementations, other networks can be used such as an intranet, an extranet, a virtual private network (VPN), a non-TCP/IP based network, any LAN or WAN or the like.

In some implementations, the engines can be of varying types including workstations, servers, computing clusters, blade servers, server farms, or any other data processing systems or computing devices. The engines can be communicably coupled to the databases via different network connections. For example, metric engine 112 can be coupled via the network 115 (e.g., the Internet), clustering engine 118 can be coupled via a direct network link, and preprocessing engine 128 can be coupled by yet a different network connection.

In some implementations, databases can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices. In some implementations, user computing device 122 can be a personal computer, laptop computer, tablet computer, smartphone, personal digital assistant (PDA), digital image capture devices, and the like.

Application 124 can take one of a number of forms, including user interfaces, dashboard interfaces, engagement consoles, and other interfaces, such as mobile interfaces, tablet interfaces, summary interfaces, or wearable interfaces. In some implementations, it can be hosted on a web-based or cloud-based privacy management application running on a computing device such as a personal computer, laptop computer, mobile device, and/or any other hand-held computing device. It can also be hosted on a non-social local application running in an on-premise environment. In one implementation, application 124 can be accessed from a browser running on a computing device. The browser can be Chrome, Internet Explorer, Firefox, Safari, and the like. In other implementations, application 124 can run as an engagement console on a computer desktop application.

Lexical data 102 store entries associated with terms in news feed items. In one implementation, it can include a glossary of words and company names such that each entry identifies the multiple mention forms that the corresponding word or company name can take. Examples of multiple mention forms include thesaurus (acquire vs. purchase vs. bought), abbreviations (Salesforce.com vs. SFDC), shortened forms (Salesforce vs. Sf), alternative spellings (Salesforce v. Salesforce.com), and stock aliases (Salesforce vs. CRM). When the news feed item pairs are matched, such multiple forms are taken in account to determine contextual resemblance between the news feed item pairs. In another implementation, it identifies common prefixes and postfixes used with company names, such as "LLP" and "Incorporation," that can be used to extract company names from the news feed items.

In some implementations, lexical data 102 serves as a dictionary that identifies various root and affix references and verb and noun forms associated with a word. In yet another implementation, lexical data 102 can include a list of stop words that are the most common words in a language (e.g. and, the, but, etc. for English). These stop words are omitted from matching of the news feed item pairs. Eliminating stop words from matching ensures that resemblance measuring between news feed item pairs is faster and efficient. In other implementations, lexical data 102 identifies inappropriate and dangerous words such as porn and sexual phrases and racist expressions.

CRM data 108 identifies various entities (persons and organizations) such as prospects, leads, and/or accounts about whom a sales engineer prefers to receive business insights. In some implementations, CRM data 108 is automatically assembled from a CRM system, such as Salesforce Chatter™, in which the sales engineer has a profile. In another implementation, CRM data 108 is specified by the sales engineer. Examples of CRM data can include accounts, leads, prospects, names, addresses, job titles, industry types, territories, market segments, stock tickers, etc. In one implementation, CRM data 108 can store web or database profiles of the users and organizations as a system of interlinked hypertext documents that can be accessed via the network(s) 115 (e.g., the Internet). In another implementation, CRM data 108 can include standard profile information about persons and organizations. This standard profile information can be extracted from company websites business registration sources such as Jigsaw, Hoovers, or Dun & Bradstreet, business intelligence sources, and/or social networking websites like Yelp, Yellow Pages, etc. In one implementation, CRM data 108 can also include business-to-business data of individuals referred to as "contacts," along with some supplemental information. This supplemental information can be names, addresses, job titles, usernames, contact information, employer name, etc.

News feed items 105 include online news articles assembled from different types of data sources. News feed items 105 can be web pages, or extracts of web pages, or programs or files such as documents, images, video files, audio files, text files, or parts of combinations of any of these stored as a system of interlinked hypertext documents that can be accessed via the network(s) 115 (e.g., the Internet) using a web crawler. Regarding different types of data sources, access controlled application programing interfaces (APIs) like Yahoo Boss, Facebook Open Graph, Twitter Firehose can provide real-time search data aggregated from numerous social media sources such as LinkedIn, Yahoo, Facebook, and Twitter. APIs can initialize sorting, processing and normalization of data. Public internet can provide data from public sources such as first hand websites, blogs, web search aggregators, and social media aggregators. Social networking sites can provide data from social media sources such as Twitter, Facebook, LinkedIn, and Klout.

Source data 125 specifies credibility of the plurality of electronic sources hosting the news feed items, according to one implementation. In another implementation, source data 125 stores metadata associated with each source such as source URL and source type (API, website, or social networking site).

Preprocessing engine 128 generates a qualified version of the assembled news feed items based on one or more occurrences of mandatory or prohibited words in respective titles and descriptions of the news feed items. The mandatory words include a set of regular expressions that must appear in a news feed item to be presented to a sales engineer. The prohibited words include a set of regular expressions that should not appear in a news feed item to be presented to a sales engineer. In one example, for a topic related to "Presidency" for which news feed items about presidency are presented to a sales engineer, the word "president" is the mandatory word and the words "vice," "secretary," or "assistant" are the prohibited words. In another example, for a topic related to "Porn" for which news feed items about porn are omitted, the word "anal" is the mandatory word and the words "medicine," or "medical" are the prohibited words.

According to one implementation, de-duplicates similar feed items by identifying a name of at least one company to which a particular news feed item relates to and finding other news feed items about the same company. In one implementation, preprocessing engine 128 matches a textual mention in a news feed item to an entry in the lexical data 102, such as a company name, that is a canonical entry for the textual mention. This implementation also includes looking up variants of the company name to identify mentions of any known abbreviations, shortened forms, alternative spellings, or stock aliases of the company name.

According to some implementations, preprocessing engine 128 identifies news feed items with common text mentions, including exact matches of company names and equivalent matches of company names variants. In another implementation, preprocessing engine 128 removes any stop words from the news feed items to facilitate efficient comparison of the news feed items, preferably before identifying common company-name mentions.

According to some implementations, duplicate news feed items are further determined based on common token occurrences in the news feed items that are identified as belonging to a same company. A "token" refers to any of a variety of possible language units, such as a word, a phrase, a number, a symbol, or the like, that represents a smallest unit of language that conveys meaning. In one implementation, a news feed item can be decomposed into one or more tokens using a tokenizer, which represents a set of language specific rules that define a boundary of a token.

Based on noun and verb variants of the tokens (stored in lexical data 102), preprocessing engine 128 identifies not only exact token occurrences, but also equivalent token occurrences between news feed items belonging to a same company. For example, consider a first news feed item that includes "BlSp announce a new ceo" and a second news feed item that includes "BlSp announces upgrade in its servers." In this example, processing engine 128, after determining that the first and second news feed item pairs belong to the same company named "BlSp," further identifies that they respectively include distinctive singular and plural forms of the same word "announce" and hence have greater contextual resemblance with each other relative to other news feed items about the same company that lack such a common word.

Given a collection of similar news feed item pairs to be de-duplicated, clustering engine 118 applies a resemblance function to all pairs of news feed items to obtain a weighted resemblance graph where the nodes are the news feed items in the collection and there is a weighted edge connecting each pair of nodes, the weight representing the amount of resemblance. The resemblance function returns a resemblance measure which can be a value between 0 and 1, according to one implementation. A higher value indicates a greater resemblance with 1 denoting equality. In some implementations, clustering engine 118 decomposes or partitions the resemblance graph into its strongly connected components where nodes that are connected with large edge weights have a greater likelihood of being in the same group of contextually similar insights. In one implementation, only those edges whose weight is above a given threshold are used for determining the strongly connected components. As a result, when the set of news feed items is very large, clustering performs a blocking to bring similar "components" of news feed items together, and a finger-grained pairwise comparison is only performed within each component.

Metric engine 112 determines a plurality of metric values for the news feed items and orders the news feed items based on such metric values. In one implementation, such metric values are based on different metrics like source metric, business metric, company reference metric, social buzz metric, and matched account metric. In some implementations, metric engine 112 returns a Double that represents the metric value for a particular metric. In other implementations, metric engine 112 calculates a total metric value based on an average value of two or more metric values. In yet other implementations, metric values below a pre-determined threshold are not used for calculating the total metric value.

In one implementation, the metric engine 112 determines a recency metric value associated with each news feed item, which specifies a time duration since publication of the news feed items. In some implementations, the time duration can be a number of hours or a number of days since the news feed item was published. In other implementations, the passed time duration can be translated to the recency metric value according to the following mapping:

1 hour=1
5 hours=0.95
1 day=0.8
3 days=0.7
5 days=0.6
10 days=0.4
100 days=0.05

In another implementation, metric engine 112 determines a credibility of the respective sources, from which the news feed items are assembled, based on predetermined source metric values. Some examples of such predetermined metric values are described below:

Sources that are credible and return business-related results=1
Sources that are credible but return non-business results=0.8
Sources that are not credible=0.6
Sources that return meaningful results=0.3
Sources that return vague results=0.1
Sources that return non-meaningful results=0

In other implementations, metric engine 112 specifies a social buzz metric value associated with each of the electronic sources hosting the news feed items. The social buzz can be based on a number of users following the sources' social media accounts or groups and/or a number of social media posts of news feed items belonging to the sources, according to one implementation.

In yet another implementation, metric engine 112 calculates a business metric value for the news feed items. The business metric value specifies a business value of the news feed items based on one or more occurrence of business nomenclature in at least one of respective titles and descriptions of the news feed items. For instance, appearance of a 'strong word' like "shareholders" adds a count of 4 to the business metric value of a particular news feed item, a 'relatively strong word' like "acquires" adds 3 count, a 'normal word' like "announce" adds 2 counts, a 'normal-low word' like "agreement" adds 1 count, and a "non-relevant" word such as "drink" adds 0 counts. In one example, metric engine 112 further translates the occurrences of such different types of business information words in the titles or descriptions of the news feed items into business metric values according to the following mapping:

two strong words and two normal words=1
two strong words=0.9
two or three normal words=0.8
one normal word=0.6
one non-relevant word=0.01

In a further implementation, metric engine 112 determines a company reference metric value for the news feed items that specifies definality of one or more mentions in the news feed items as company names based on at least one of alternative usage of the mentions, location of the mentions in at least one of respective titles and descriptions of the news feed items, letter case of the mentions, letter case of first character of the mentions, and subject and predicate analysis of the news feed items. The definality of the mention determines whether the mention can be used only for a particular company name, or it can be used for other purposes. For example, in the phrase "Apple announces that Steve Jobs like to eat an apple every Sunday morning," the first occurrence of "apple" is the company name, and the second one is the fruit. This determination that whether a word can be used for multiple purposes is made by using the lexical data database 102 and CRM data database 108, which include general dictionaries, person name dictionaries, locations dictionary. Words that are part of these databases are considered ambiguous mentions and the words that are not part of these dictionaries, such as company names, are considered unambiguous mentions. Ambiguous mentions require a further evaluation for determining their purpose, whereas unambiguous mentions, like Salesforce™, usually have a per se definitive purpose, according to one implementation. Similarly, preset mentions like company names and their alternative forms identified in lexical data database 102 and CRM data database 108 have a definitive meaning and thus their mentions are given high company reference metric values i.e. preset values.

In some implementations, if a word is capitalized and is not the first word of the sentence and all the remaining of the sentence is not capitalized, then such a word is given higher company reference metric value relative to other words. An all caps word is given similar higher reference metric value. In addition, if a word following a company name is not a "WH" question, then the company name is considered to be a subject in that corresponding sentence. In such instances, the company name mention, being the subject of the sentence, is given a high company reference value. For example, in a news feed item including the text "Salesforce buys BlueSpring for 19 B dollars" "Salesforce" is the subject of the sentence, "BlueSpring" is an object of the sentence. Both company name mentions are given high company reference metric values but that of "Salesforce" is given higher because of its subject status.

Further, a news feed item with a company name in its first few words is considered to have high company reference value. In another implementation, a new feed item with a business reference mention immediately or near-immediately (e.g. 2 positions) following a company name is given a high company reference value. In other implementations, metric engine 112 translates occurrences of the different company reference mentions according to the following mapping:

four preset mentions=1
two perfect mentions=0.7
two unambiguous mentions=0.6

In some other implementations, metric engine 112 specifies a social buzz metric value associated with each of the news feed items. The social buzz can be based on a number of users that endorse (likes, thumbs up, comment, +1) respective sources in the plurality of electronic sources on one or more social networking environments and a number of times the news feed items have been posted (shares, retweets) on the social networking environments. In one example, metric engine 112 calculates the social buzz metric value according to the following mapping:

300 retweets=1
100 retweets=0.9
20 retweets=0.8
10 retweets=0.7
4 retweets=0.6
0 retweets=0.5

In another implementation, metric engine 112 determines a title length metric value for the news feed items that specifies a number of words in respective titles of the news feed items. In one implementation, the title length metric value is calculated after omission of stop words from the news feed items and is based on the following exemplary mapping:

>50 words=0.05
25 words=0.5
13 words=1
4 words=0.9
2 words=0.7
0 words=0

In some implementations, metric engine 112 determines cluster metric values for duplicate insights grouped based on their common topic. In one implementation, the cluster metric values are calculated based on at least one of further including calculating cluster metric values for the clusters based on at least one of number of insights in respective clusters, source metric values of insights in respective clusters such that source metric values of the respective insights are added to the cluster metric value rather than a perfect one count, average total metric values of insights in respective clusters, and average total metric values of a subset of non-representative insights in respective clusters. As a result, different mappings of the cluster metric values to their constituent insights are created such that clusters with fewer good insights get a lower cluster metric value, clusters with several good insights are assigned a perfect cluster metric value, and clusters with average total metric values above a threshold get an average cluster metric value.

In a further implementation, metric engine 112 determines a matched account metric value for the news feed items that specifies correlation between one or more customer relation management (CRM) accounts preferred by the sales engineer and the news feed items. The sales engineer's preferences can be accessed using the CRM data database 108, according to one implementation. The metric engine 112 evaluates the news feed items to identify whether there are mentions of names of accounts preferred and/or specified by the sales engineer. In the case where there are any matched accounts in the news feed items, the corresponding news feed items are given high matched account metric values.

In other implementations, metric engine 112 determines a global interest metric value for the news feed items that specifies importance of the news feed items based on one or more occurrences of popularity-indicative words in respective titles and descriptions of the news feed items. Examples of popularity-indicative words include "huge," "success," and "big." For instance, if a news feed item includes "BlueSpring has a huge announcement," then the presence of the word "huge" results in a high global interest metric value of the corresponding news feed item.

In another implementation, a dangerous phrases metric value is calculated for the news feed items by the metric engine 112 such that news feed items that include offensive words like racial slurs are given a high dangerous phrases metric value. As a results, such news feed items are removed from presentation to the sales engineer. Further, a picture metric value, indicative of the content-quality of the news feed items, is calculated for the news feed items where the news feed items with images, videos, or any other forms of multimedia are given a high picture metric value by the metric engine 112. In yet another implementation, news feed items that include stock tickers are considered to have financial-contextuality and hence are given a high ticker metric value relative to other news feed items by the metric engine 112.

News Feed Items

FIG. 2 shows a set 200 of news feed items assembled from a plurality of electronic sources. In FIG. 2, six news feed items 205-255 are collected from different sources described above and include at least one of webpages, RSS feeds, social media feeds such as twitter feeds, and documents. In some implementations, news feed items 205-255 are published with a time window prior to a current time such that other news feed items outside the time window are not included in the set 200. In one implementation, news feed items 205-255 are grouped together because they relate to a same company and are used to evaluate a newly received news feed item that shares the same company name reference as the news feed item group 205-255.

As shown in FIG. 2, news feed items 205-255 belong to different types of sources. For example, news feed item 205 belongs to a mainstream news channel "CNS news," news feed item 215 is from an entertainment website "Spicenew.com," news feed item 225 is from a sports website, news feed item 235 from a financial website, news feed item 245 is from a commerce website, and news feed item 255 from a popular website.

FIGS. 3A and 3B depicts one implementation of a plurality of objects 300A-B that can be used to generate important business insights. As described above, this and other data structure descriptions that are expressed in terms of objects can also be implemented as tables that store multiple records or object types. Reference to objects is for convenience of explanation and not as a limitation on the data structure implementation. FIG. 3 shows source metric values objects 302, news feed items objects 312, social buzz metric values objects 322, account preference metric values objects 332, global interest metric values objects 342, dangerous phrases metric values objects 352, business metric values objects 362, and company reference metric values objects 372. In other implementations, objects 300A-B may not have the same objects, tables, entries or fields as those listed above and/or may have other/different objects, tables, entries or fields instead of, or in addition to, those listed above such as prefix object, synonym object, and stop words object.

Source metric values objects 302 uniquely identify each source from which new feed items are assembled along with their credibility measures. As shown in FIG. 3A, "CNS News" and "Financialforce.com" have high credibility being mainstream and financial websites, respectively. To the contrary, "Bayevents.org" and "Spicenews.com" have low credibility.

News feed items objects 312 includes fields that specify the title, description, the originating source, and a unique feed item identification (ID) for each news feed item. Social buzz metric values objects 322 identify the number of endorsements such as likes, thumb ups, comments, etc. made on the respective news feed items along with the number of times the respective news feed items have been posted on various social media sites.

Account preference metric values objects 332 lists the accounts specified and preferred by the sales engineer for which the sales engineer would like to receive business insights. It also identifies a preference value associated with each such account. Global interest metric values objects 342 identifies words that are indicative of world-wide popularity of the news feed items. It also includes an interest value linked to each entry of a popularity-indicative word. Dangerous phrases metric values objects 352 store offensive words that suggest that insight feed items including such offensive words should be prevented from presentation to the sales engineer, along with a danger value that species the degree of offensiveness of that particular term.

Further, business metric values objects 362 stores the various business terms and phrases that are likely of interest to the sales engineer. It also includes a business value field that indicates a level of business importance of that term. Similarly, company reference metric values objects 372 can identify the different name forms associated with a particular company. For instance, a company named "BlueSpring" can have an alternative name of "bluSpr" and an abbreviation of "BlsP," and a stock ticker of "CRM." Such variant name forms can be assigned unique name IDs that can be linked to the unique name ID of the most commonly used name or legal name of the company, along with a reference value that specifies definality of the company names as representing the corresponding company.

In other implementations, objects 300A-B can have one or more of the following variables with certain attributes: FEED_ID being CHAR (15 BYTE), SOURCE_ID being CHAR (15 BYTE), PUBLICATION_DATE_DATE being CHAR (15 BYTE), PUBLICATION_TIME_TIME being CHAR (15 BYTE), URL_LINK being CHAR (15 BYTE), CREATED_BY being CHAR (15 BYTE), CREATED_DATE being DATE, and DELETED being CHAR (1 BYTE).

Business Insights

FIG. 4 is one implementation of ordered 400 news feed items based on a plurality of metric values. Out of the news feed items 205-255 described in FIG. 2, only four news feed items 205, 255, 235, 245 are presented to the sales engineer in FIG. 4. This occurs because the pre-processing engine 128 detects a prohibited word "nude" in the news feed item 215 and removes it from presentation to the sales engineer. Similarly, news feed item 225 is removed as well because it includes a racist expression "Slave-Master."

Advancing to the qualified news feed items 205, 255, 235, 245, they are presented in an ordered format such that news feed items with higher total metric values are prominently placed above other qualified news feed items, as determined by the metric engine 112 based on respective metric mappings described above. In some implementations, qualified news feed items with total metric values below a threshold are removed from presentation to the sales engineer. As shown in FIG. 4, news feed item 205 includes company name references (BlueTail) along with two mentions of accounts preferred by the sales engineer (Salesforce, Data.com) and business nomenclature (acquires). Further, news feed item 235 includes a stock ticker (KLT), three instances of business nomenclature (stock, points, share prices), and global interest word (spikes). Also, news feed item 245 has a company name reference (Roland) and two mentions of business nomenclature (shareholders). Moreover, news feed item 255 includes three mentions of company name reference (KallTech).

In one implementation, these prioritized and personalized news feed items are presented through an insight interface or dashboard 402 in response to the sales engineer selecting an "insights feed" button 412. Interface 402 can take one of a number of forms, including a user interface, dashboard interface, engagement console, and other interface, such as a mobile interface, tablet interface, summary interface, or wearable interface. In some implementations, it can be hosted on a web-based or cloud-based privacy management application running on a computing device such as a personal computer, laptop computer, mobile device, and/or any other hand-held computing device. It can also be hosted on a non-social local application running in an on-premise environment.

Flowchart of Generating Important Business Insights

FIG. 5 is a representative method 500 of generating important business insights. Flowchart 500 can be implemented at least partially with a database system, e.g., by one or more processors configured to receive or retrieve information, process the information, store results, and transmit the results. Other implementations may perform the actions in different orders and/or with different, varying, alternative, modified, fewer or additional actions than those illustrated in FIG. 5. Multiple actions can be combined in some implementations. For convenience, this flowchart is described with reference to the system that carries out a method. The system is not necessarily part of the method.

At action 502, a set of news feed items for companies of interest to a sales engineer is assembled from a plurality of electronic sources and grouped into clusters based on at least one topic. The electronic sources include access controlled APIs, public Internet, and social networking sites. In one implementation, the news feed items are published within a predetermined time window prior to a current time. In some implementations, a graph is constructed of the news feed items in the assembled set and a connection strength between news feed items belonging to a same topic is represented as edges between nodes representing the news feed items, thereby forming connected node pairs. In one implementation, the connection strength is calculated between the connected node pairs based on at least one of titles of the news feed items, publication duration of the news feed items, and target unified resource locators (URLs) of the news feed items. Further, the news feed items with connection strength above a threshold are grouped into clusters. In other implementations, calculating the connection strength between the connected node pairs based on the titles of the news feed items further includes resolving at least one of spelling variations, alternative names, and abbreviated forms in the titles.

At action 512, the clusters are preprocessed to qualify some of the news feed items to return or not based on one or more occurrences of mandatory or prohibited words in respective titles and descriptions of the news feed items. Mandatory words represent the topic for which the news feed items are clustered and the prohibited words include improper words that offensive and politically incorrect.

At action 522, a plurality of metric values are determined for each of the returned news feed item that are based on at least one of source metric, business metric, company reference metric, social buzz metric, and matched account metric. In one implementation, a source metric specifies credibility of the plurality of electronic sources hosting the news feed items. In another implementation, a business metric specifies business value of the news feed items based on one or more occurrence of business nomenclature in at least one of respective titles and descriptions of the news feed items. In yet another implementation, a company reference metric specifies definality of one or more mentions in the news feed items as company names based on at least one of alternative usage of the mentions, location of the mentions in at least one of respective titles and descriptions of the news feed items, letter case of the mentions, letter case of first character of the mentions, and subject and predicate analysis of the news feed items.

In a further implementation, a social buzz metric specifies at least one of a number of users that endorse respective sources in the plurality of electronic sources on one or more social networking environments and a number of times the news feed items have been posted on the social networking environments. In another implementation, a matched account metric specifies correlation between one or more CRM accounts preferred by the sales engineer and the news feed items. In an implementation, a recency metric that specifies a time duration since publication of the news feed items. In another implementation, a title length metric that specifies a number of words in respective titles of the news feed item.

In yet another implementation, a global interest metric that specifies importance of the news feed items based on one or more occurrences of popularity-indicative words in respective titles and descriptions of the news feed items. In another implementation, a dangerous phrases metric that specifies impropriety of the news feed items based on one or more occurrences of offensive words in respective titles and descriptions of the news feed items.

In a further implementation, a picture metric that specifies content-quality of the news feed items based on one or more occurrences of images in the news feed items. In some another implementation, a ticker metric that specifies financial-contextuality of the news feed items based on one or more occurrences of stock stickers in respective titles and descriptions of the news feed items.

At action 532, the news feed items are ordered, based on the determined metric values, with respect to one or more of source reputation, business activity-related vocabulary, company-name mention, social buzz, and correlation with accounts preferred by the sales engineer. Further, the ordered news feed items are presented to the sales engineer as business insights about the topics. In some implementations, a total metric value is calculated based on an average value of two or more metric values and the news feed items are ordered based on the total metric value of respective news feed items. In yet other implementations, metric values below a pre-determined threshold are not used for calculating the total metric value.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in sections of this application such as business insights generation environment, news feed items, business insights, etc.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Computer System

FIG. 6 is a block diagram of an example computer system 600 used to generate important business insights. Computer system 610 typically includes at least one processor 614 that communicates with a number of peripheral devices via bus subsystem 612. These peripheral devices can include a storage subsystem 624 including, for example, memory devices and a file storage subsystem, user interface input devices 622, user interface output devices 618, and a network interface subsystem 616. The input and output devices allow user interaction with computer system 610. Network interface subsystem 616 provides an interface to outside networks, including an interface to corresponding interface devices in other computer systems.

User interface input devices 622 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 610.

User interface output devices 618 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules and methods described herein. These software modules are generally executed by processor 614 alone or in combination with other processors.

Memory 626 used in the storage subsystem can include a number of memories including a main random access memory (RAM) 634 for storage of instructions and data during program execution and a read only memory (ROM) 632 in which fixed instructions are stored. A file storage subsystem 628 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 628 in the storage subsystem 624, or in other machines accessible by the processor.

Bus subsystem 612 provides a mechanism for letting the various components and subsystems of computer system 610 communicate with each other as intended. Although bus subsystem 612 is shown schematically as a single bus, alternative implementations of the bus subsystem can use multiple busses. Application server 620 can be a framework that allows the applications of computer system 600 to run, such as the hardware and/or software, e.g., the operating system.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as one example. Many other configurations of computer system 610 are possible having more or fewer components than the computer system depicted in FIG. 6.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method for automatically prioritizing news feed items, the method including:
    assembling a set of the news feed items for companies of interest from a plurality of electronic sources for display to a user;
    grouping the set into clusters based on topics by:
    constructing a graph of the news feed items in the set and representing a connection strength as edges between nodes representing the news feed items, thereby forming connected node pairs;
    calculating the connection strength between the nodes of the connected node pairs based on target unified resource locators (URLs) of the news feed items; and
    grouping the news feed items, with the connection strength above a threshold, into the clusters;
    preprocessing the clusters to qualify some of the news feed items to return or not based on one or more occurrences of mandatory or prohibited words in respective titles and descriptions of the news feed items, wherein the news feed items that contain a prohibited word are filtered out and not returned;
    determining a metric value for at least two of the news feed items that are returned;
    determining an order for the at least two news feed items, based at least in part on the metric value; and
    presenting, to the user, the returned news feed items about the topics, wherein the at least two news feed items are presented according to the determined order.

2. The method of claim 1, wherein the calculating the connection strength between the nodes of the connected node pairs is further based on at least one of titles of the news feed items or publication duration of the news feed items.

3. The method of claim 2, wherein the calculating the connection strength between the nodes of the connected node pairs based on the titles of the news feed items further includes resolving at least one of spelling variations, alternative names, or abbreviated forms in the titles.

4. The method of claim 1, further including:
    identifying, from the returned news feed items, a representative news feed item with a highest total metric value; and
    presenting the representative news feed item to the user.

5. The method of claim 1, wherein the metric value is based on a source metric that specifies a credibility of the plurality of electronic sources hosting the news feed items.

6. The method of claim 1, wherein the metric value is based on a business metric that specifies a business value of the news feed items based on the one or more occurrence of business nomenclature in at least one of the respective titles or the descriptions of the news feed items.

7. The method of claim 1, wherein the metric value is based on a company reference metric that specifies a definality of a mention, in the news feed items, of a company name is based on at least one of:
    an alternative usage of the mention;
    a location of the mention in the at least one of the respective titles or the descriptions of the news feed items;
    a letter case of the mention;
    a letter case of a first character of the mention; or
    a location subject and a predicate analysis of the news feed items.

8. The method of claim 1, wherein the metric value is based on a social buzz metric that specifies at least one of:
    a number of users that endorse respective sources in the plurality of electronic sources on one or more social networking environments; or a number of times the news feed items have been posted on the social networking environments.

9. The method of claim 1, wherein the metric value is based on a matched account metric that specifies a correlation between one or more customer relation management (CRM) accounts preferred by the user and the news feed items.

10. The method of claim 1, wherein the metric value is based on a recency metric that specifies a time duration since publication of the news feed items.

11. The method of claim 1, wherein the metric value is based on a title length metric that specifies a number of words in respective titles of the news feed items.

12. The method of claim 1, wherein the metric value is based on a global interest metric that specifies an importance of the news feed items based on one or more occurrences of popularity-indicative words in the at least one of the respective titles or the descriptions of the news feed items.

13. The method of claim 1, wherein the metric value is based on a dangerous phrases metric that specifies an impropriety of the news feed items based on one or more occurrences of offensive words in the at least one of the respective titles or the descriptions of the news feed items.

14. The method of claim 1, wherein the metric value is based on a picture metric that specifies a content-quality of the news feed items based on one or more occurrences of images in the news feed items.

15. The method of claim 1, wherein the metric value is based on a ticker metric that specifies a financial-contextuality of the news feed items based on one or more occurrences of stock stickers in the at least one of the respective titles or the descriptions of the news feed items.

16. The method of claim 1, further including calculating cluster metric values for the clusters based on at least one of:
    a number of insights in respective clusters;
    source metric values of the insights in the respective clusters;
    average total metric values of the insights in the respective clusters; or
    average total metric values of a subset of non-representative insights in the respective clusters.

17. A system for automatically prioritizing news feed items, the system including:
    a processor and a computer readable storage medium storing computer instructions configured to cause the processor to:
    assemble a set of the news feed items for companies of interest from a plurality of electronic sources for display to a user;
    grouping the set into clusters based on topics by:
    constructing a graph of the news feed items in the set and representing a connection strength as edges between nodes representing the news feed items, thereby forming connected node pairs;
    calculating the connection strength between the nodes of the connected node pairs based on target unified resource locators (URLs) of the news feed items; and
    grouping the news feed items, with the connection strength above a threshold, into the clusters;
    preprocess the clusters to qualify some of the news feed items to return or not based on one or more occurrences of mandatory or prohibited words in respective titles and descriptions of the news feed items, wherein the news feed items that contain a prohibited word are filtered out and not returned;
    determine a metric value for at least two of the news feed items that are returned;
    determine an order for the at least two news feed items, based at least in part on the metric value; and
    present, to the user, the returned news feed items about the topics, wherein the at least two news feed items are presented according to the determined order.

18. The system of claim 17, wherein the metric value is based on a source metric that specifies a credibility of the plurality of electronic sources hosting the news feed items.

19. The system of claim 17, wherein the metric value is based on a company reference metric that specifies a definality of a mention, in the news feed items, of a company name is based on at least one of:
    an alternative usage of the mention;
    a location of the mention in the at least one of the respective titles and the descriptions of the news feed items;
    a letter case of the mention;
    a letter case of a first character of the mention; or
    a location subject and a predicate analysis of the news feed items.

20. The system of claim 17, wherein the metric value is based on a social buzz metric that specifies at least one of:
    a number of users that endorse respective sources in the plurality of electronic sources on one or more social networking environments; or
    a number of times the news feed items have been posted on the social networking environments.

* * * * *